US011220093B2

(12) United States Patent
McCalley et al.

(10) Patent No.: US 11,220,093 B2
(45) Date of Patent: Jan. 11, 2022

(54) CLAM SHELL LAMINATION SYSTEM

(71) Applicant: Rockwell Collins, Inc., Cedar Rapids, IA (US)

(72) Inventors: Cameron T. McCalley, Marion, IA (US); Ryan N. Klaassen, Marion, IA (US); James D. Sampica, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 156 days.

(21) Appl. No.: 16/552,000

(22) Filed: Aug. 27, 2019

(65) Prior Publication Data

US 2021/0060916 A1  Mar. 4, 2021

(51) Int. Cl.
*B32B 37/00* (2006.01)
*B32B 38/18* (2006.01)

(52) U.S. Cl.
CPC ...... *B32B 37/0053* (2013.01); *B32B 38/1858* (2013.01)

(58) Field of Classification Search
CPC . B32B 37/0053; B32B 38/1858; B32B 37/10; B30B 5/02
See application file for complete search history.

(56) References Cited

U.S. PATENT DOCUMENTS

| | | | |
|---|---|---|---|
| 6,110,556 A * | 8/2000 | Bang | C23C 16/455 118/715 |
| 6,312,247 B1 | 11/2001 | Kassuelke et al. | |
| 6,991,699 B2 | 1/2006 | Lee et al. | |
| 7,416,010 B2 | 8/2008 | Byun et al. | |
| 9,981,460 B1 | 5/2018 | McCalley et al. | |
| 10,315,400 B2 | 6/2019 | Son et al. | |
| 2005/0178428 A1 | 8/2005 | Laaly et al. | |
| 2007/0095477 A1* | 5/2007 | Arita | H01L 21/67069 156/345.47 |
| 2012/0129292 A1 | 5/2012 | Safir | |
| 2017/0355177 A1 | 12/2017 | Bux | |

FOREIGN PATENT DOCUMENTS

EP  2476550 A1  7/2012

OTHER PUBLICATIONS

Extended EP Search Report dated Jun. 24, 2020 for EP Application No. 19216238.

* cited by examiner

*Primary Examiner* — Mark A Osele
*Assistant Examiner* — Christopher C Caillouet
(74) *Attorney, Agent, or Firm* — Suiter Swantz pc llo (57) ABSTRACT

A high-speed lamination machine includes a hinged, clamshell lid, and clamped lamination chamber that uses localized and thermally isolated heating and stepper driven separation pin motion. Pneumatically actuated rollers in a track clamp the lamination chamber closed during operation. The clamshell design obviates the need for a hydraulic press and makes the lamination chamber easily accessible to other automated systems, so robots may be used to place lamination elements within the chamber.

14 Claims, 10 Drawing Sheets

CLAM SHELL LAMINATION SYSTEM

BACKGROUND

Existing high-speed, single piece flow, lamination processes require a hydraulic press to manage the lid opening and closing of the chamber during the high-pressure autoclave process steps, as well as positioning and applying the clamping force required to seal the chamber. Such processes often require greater than thirty-ton hydraulic presses. Such systems are expensive; access to the interior of the chamber is limited as the hydraulic press is located directly above the chamber with a limited opening height and surrounded by press-guide pins; and the systems are extremely heavy. Due to the size and weight of the systems, they are often permanently installed in a location specially adapted for the hydraulic press, making the systems difficult or impossible to move.

Such systems have long start-up requirements as the heat sources are in the press platens which are far from the work pieces and have large thermal mass to pre-heat. Thermal energy waste is high because the entire press frame is heated throughout the day. High frequency use of the hydraulic pump system creates a thermal management issue as the entire system becomes hot and may take hours to cool down. Because the hydraulic press is large and heavy, top-tier safety management with redundant safety measures are required.

SUMMARY

In one aspect, a high-speed lamination machine includes a hinged, clamshell lid, and clamped lamination chamber that uses localized and thermally isolated heating and stepper driven separation pin motion. The clamshell design obviates the need for a hydraulic press.

In another aspect, the clamshell design makes the lamination chamber easily accessible to other automated systems, so robots may be used to place lamination elements within the chamber.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a lamination machine having a hinged, clamshell lid, and pneumatically actuated rollers in a track to clamp the lamination chamber closed during operation.

Figure 1A:
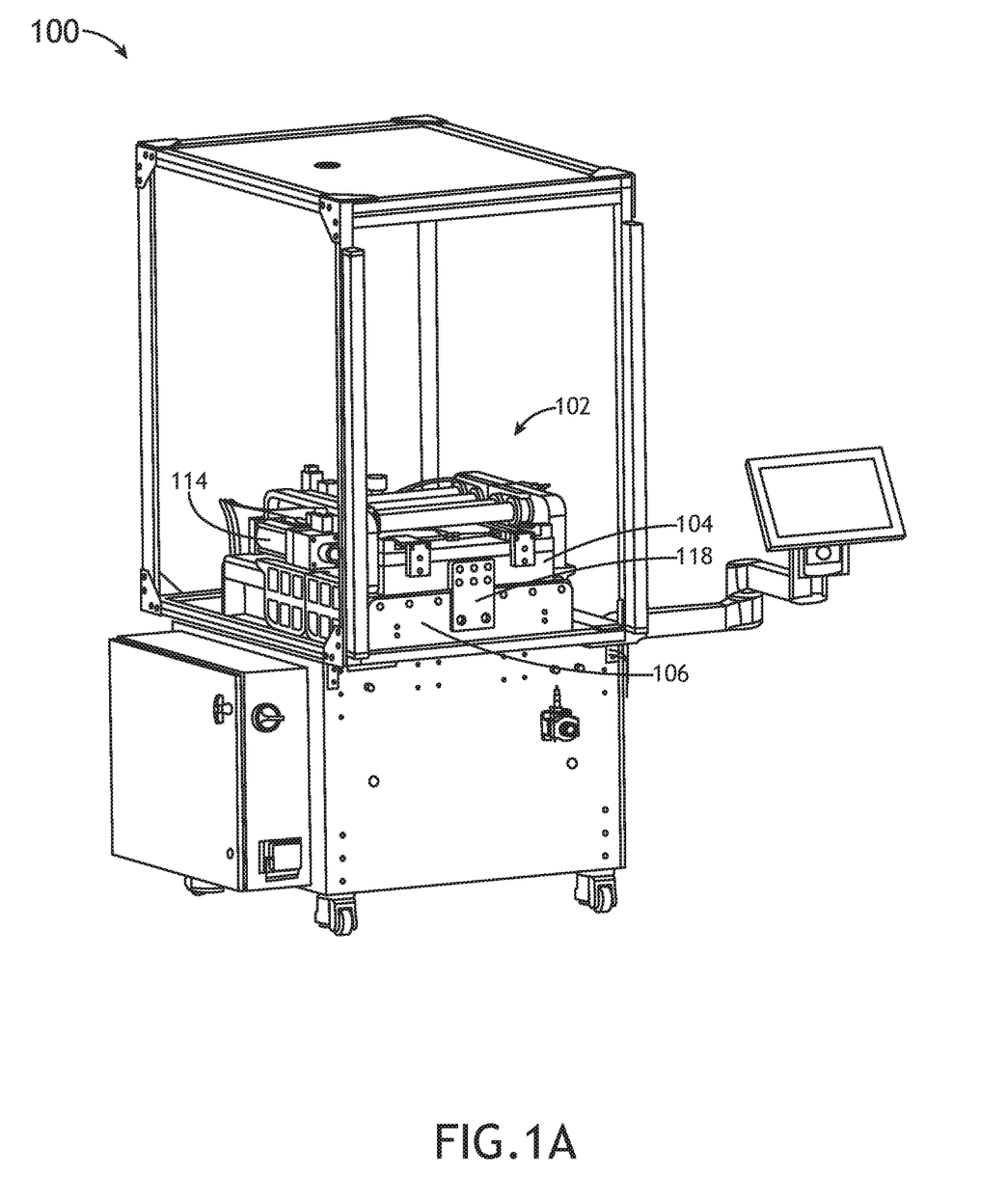
FIG. 1A shows a perspective view of a laminating machine according to an exemplary embodiment.
Figure 1B:
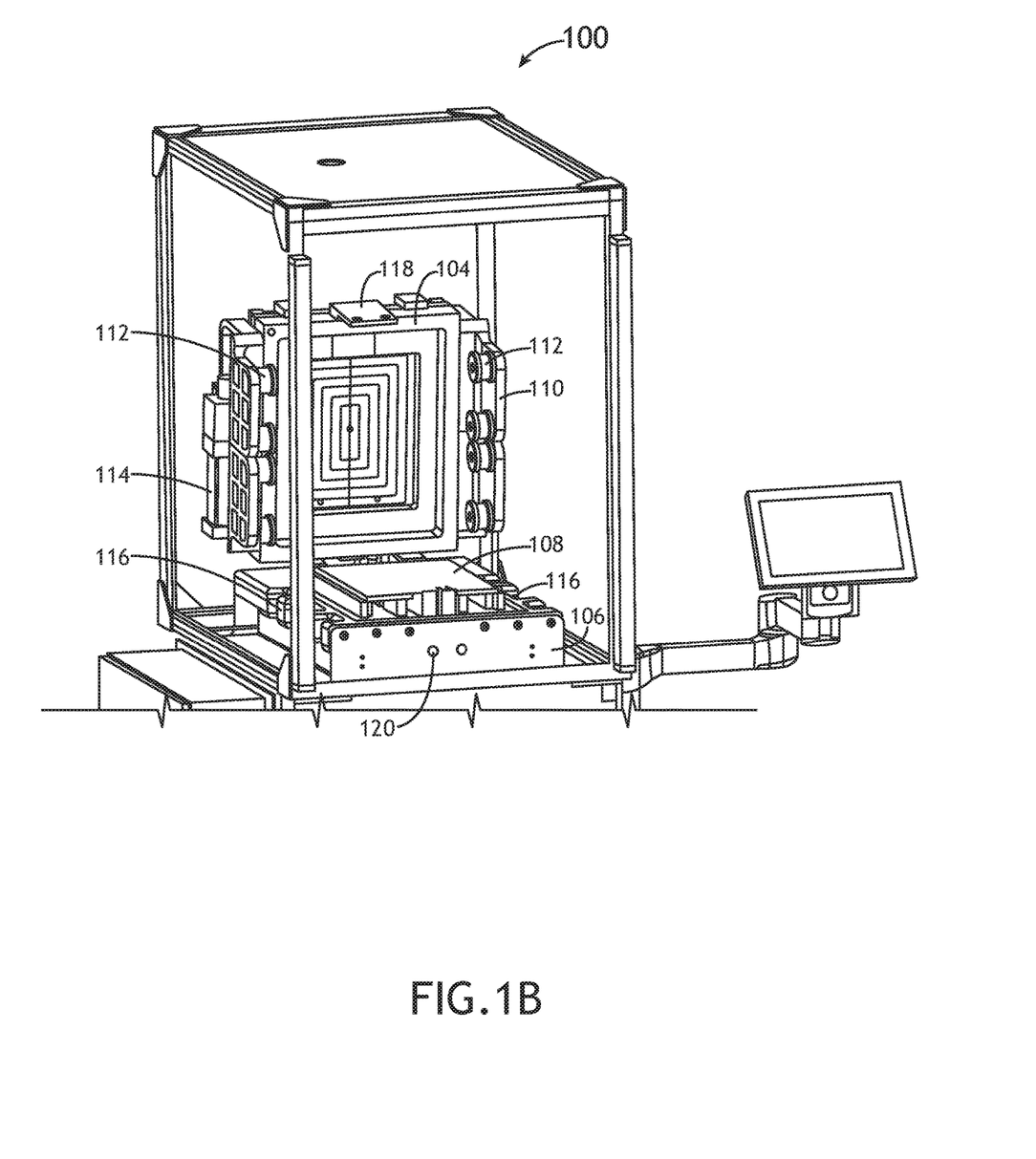
FIG. 1B shows a perspective view of a laminating machine according to an exemplary embodiment.
Figure 1C:
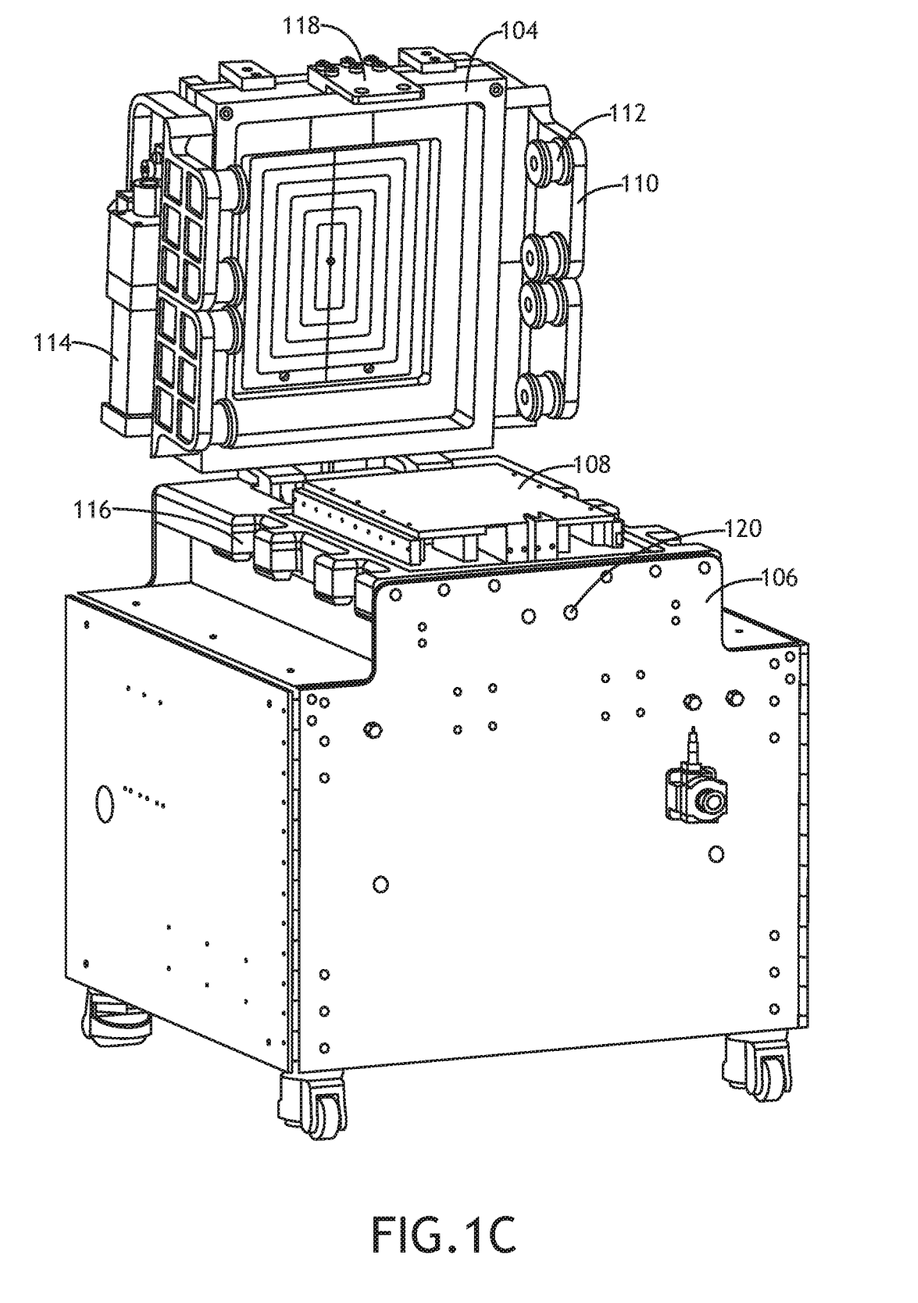
FIG. 1C shows a perspective view of a laminating machine according to an exemplary embodiment.

Referring to FIGS. 1A-1C, perspective views of a laminating machine 100 according to an exemplary embodiment are shown. The laminating machine 100 includes laminating chamber 102 having an interlocking lid 104 and base component 106 that define a laminating chamber with a platen 108 for receiving laminating components (a substrate and laminate).

The laminating chamber 102 includes one or more clamping elements 110 disposed on the lid 104 or base component 106. When disposed on the lid 104, the clamping elements 110 include base engaging components 112 that align and interlock with clamping recesses 116 defined by the base component 106. In at least one embodiment, the laminating chamber 102 includes one or more actuators 114 to facilitate secure engagement of the base engaging components 112 and clamping recesses 116. For example, the one or more actuators 114 may translate one or more of the clamping elements within a plane to force the base engaging components 112 to interlock with the clamping recesses 116.

In at least one embodiment, the laminating chamber 102 includes a locking plate 118 affixed to the lid 104. The locking plate 118 defines one or more pin holes aligned to corresponding pins 120 within the base component 106 that may engage the pin holes when the lid 104 is closed to secure and align the lid 104 to the base component 106.

Figure 2:
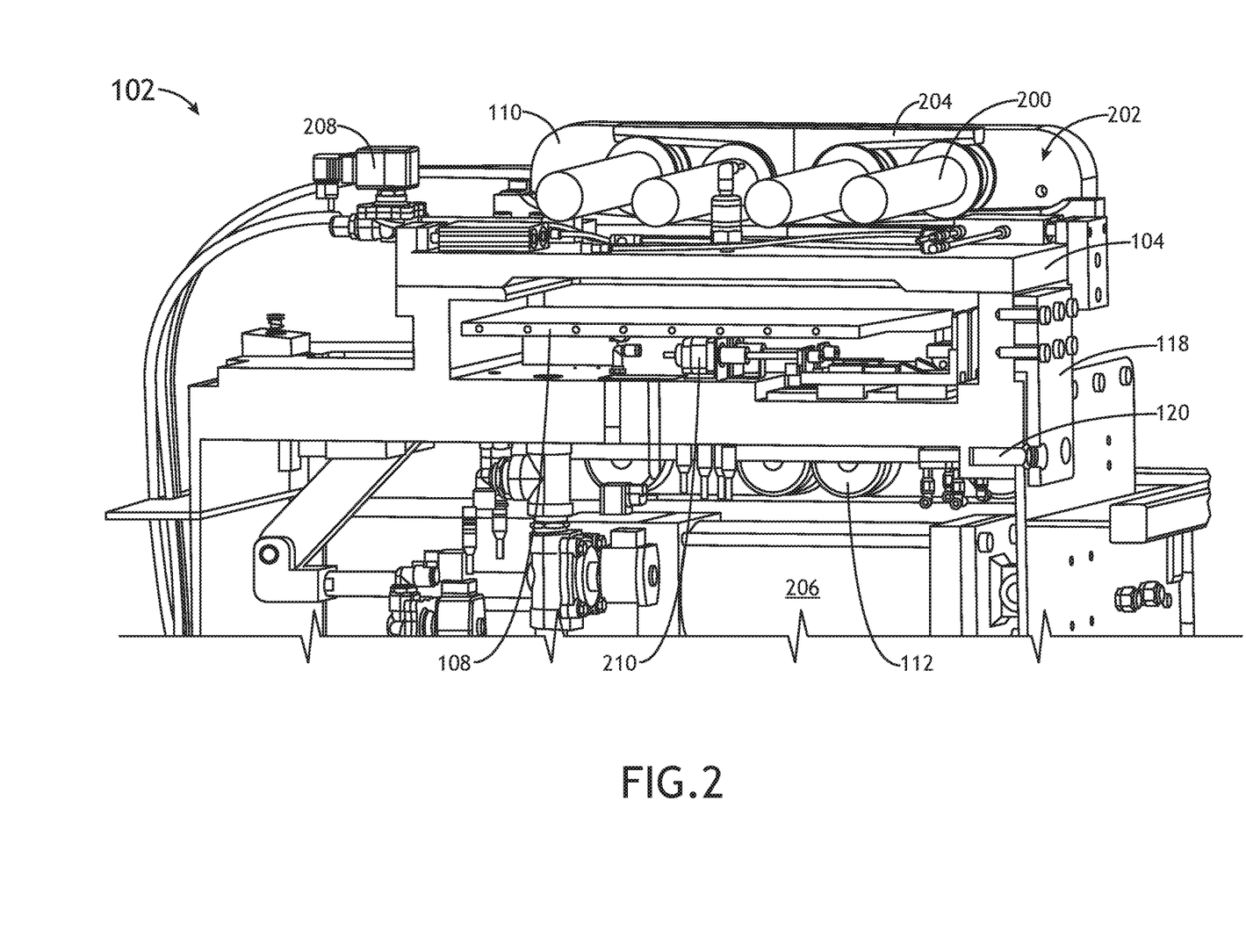
FIG. 2 shows a partial detail view of a lamination chamber according to an exemplary embodiment.

Referring to FIG. 2, a partial detail view of a lamination chamber 102 according to an exemplary embodiment is shown. A lid 104 of the lamination chamber 102 includes a plurality of rollers 200 configured to engage and travel within a track 202. The track 202 may be defined by an upper rail portion 204 having a slope configured to bias the rollers 200 down as they translate along the track 202 to apply pressure to the lid 104. The rollers 200 may be moved along the track 202 via one or more linear actuators controlled by a system of valves 208 connected to a controller. The roller 200/track 202 design creates a seem that contains the tonnage of force required while operating smoothly to prevent disturbing the lamination components that have been loaded.

In at least one embodiment, the lamination chamber 102 includes a lid actuator 206 to open and close the lid 104 about one or more hinges connecting the lid 104 to the base component 106. The controller may also control valves 208 associated with the lid actuator 206 and the actuators for translating the clamping elements.

A hinged lid 104, and system of rollers 200 and tracks 202 to hold the lid 104 shut, eliminates the need for the hydraulic press. Eliminating the hydraulic press lowers the total height of the system as there is no longer an overhead cylinder. Because there is no large cylinder, the system can be moved into standard height cleanrooms without special construction. The hinged lid 104 may be opened to completely expose the lamination chamber 102 rather than raising the lid 104 which obstructs the view and access to the lamination chamber 102. A self-contained system weighs significantly less than existing systems, and allows for casters to easily move the system so it can be installed and repositioned without forklifts and special moving equipment. High duty cycle usage does not cause overheating of the lid 104 opening and closing system as in existing systems.

In at least one embodiment, the lamination chamber 102 includes stepper motors 210 for driving programmable separation pin positioning which allows for automatic recipe. A hinged lid 104, and system of rollers 200 and tracks 202 to hold the lid 104 shut, eliminates the need for the hydraulic press. Eliminating the hydraulic press lowers the total height of the system as there is no longer an overhead cylinder. Because there is no large cylinder, the system can be moved into standard height cleanrooms without special construction. The hinged lid 104 may be opened to completely expose the lamination chamber 102 rather than raising the lid 104 which obstructs the view and access to the lamination chamber 102; for example, the system may include an OCR camera disposed above the open lamination chamber 102 to automatically load processing recipes based on the detected tooling. A self-contained system weighs significantly less than existing systems, and allows for casters to easily move the system so it can be installed and repositioned without forklifts and special moving equipment. High duty cycle usage does not cause overheating of the lid 104 opening and closing system as in existing systems.

In at least one embodiment, the lamination chamber 102 includes stepper motors 210 for driving programmable separation pin positioning which allows for automatic recipe-based Y and Z movement to optimize component separation angle and automatically compensate for different glass to LCD offsets. Because of the programmable pins, embodiments of the present disclosure facilitate much easier tooling changes as compared to prior art systems.

Figure 3A:
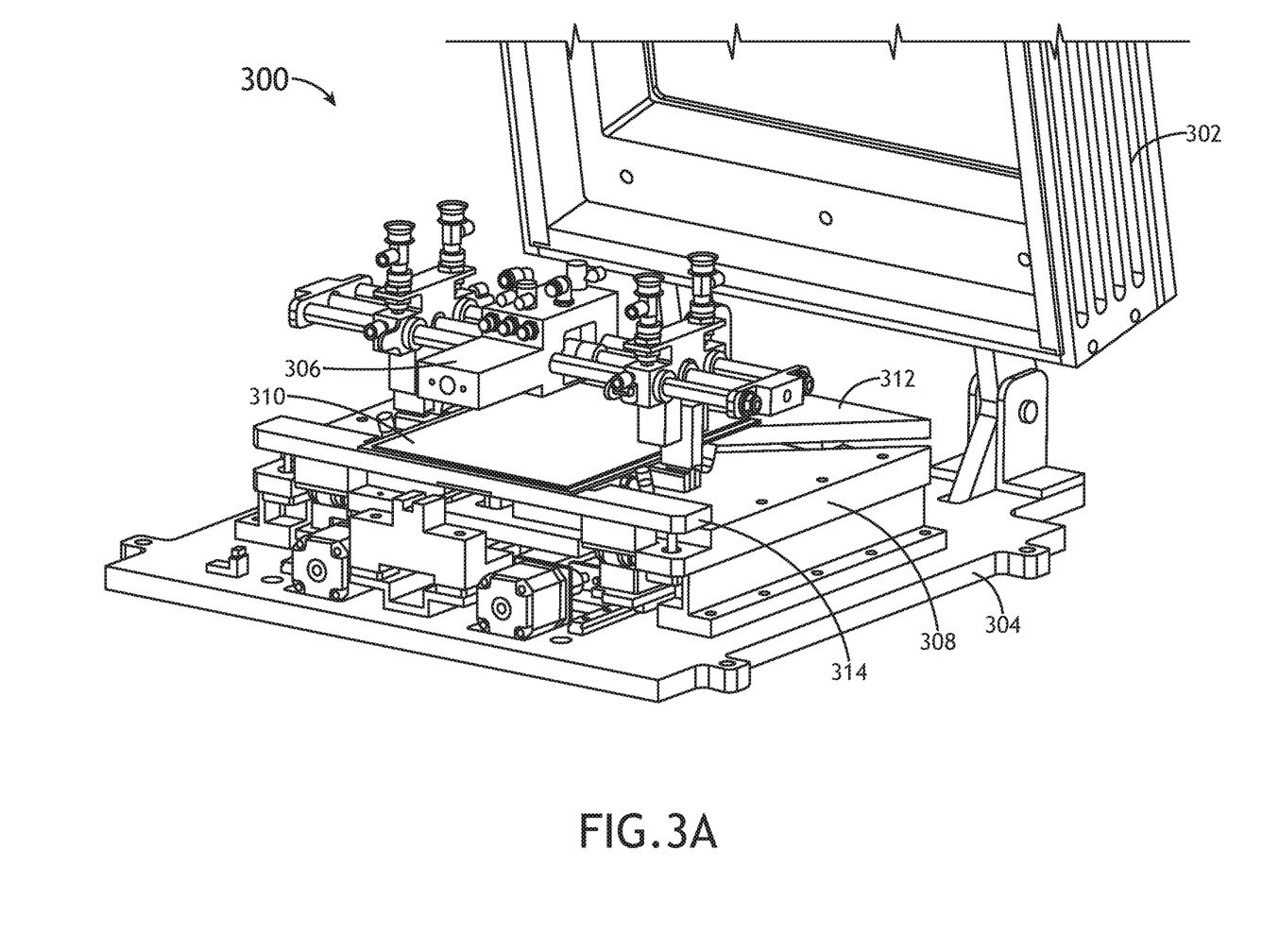
FIG. 3A shows a perspective detail view of a lamination chamber with a handling element according to an exemplary embodiment.
Figure 3B:
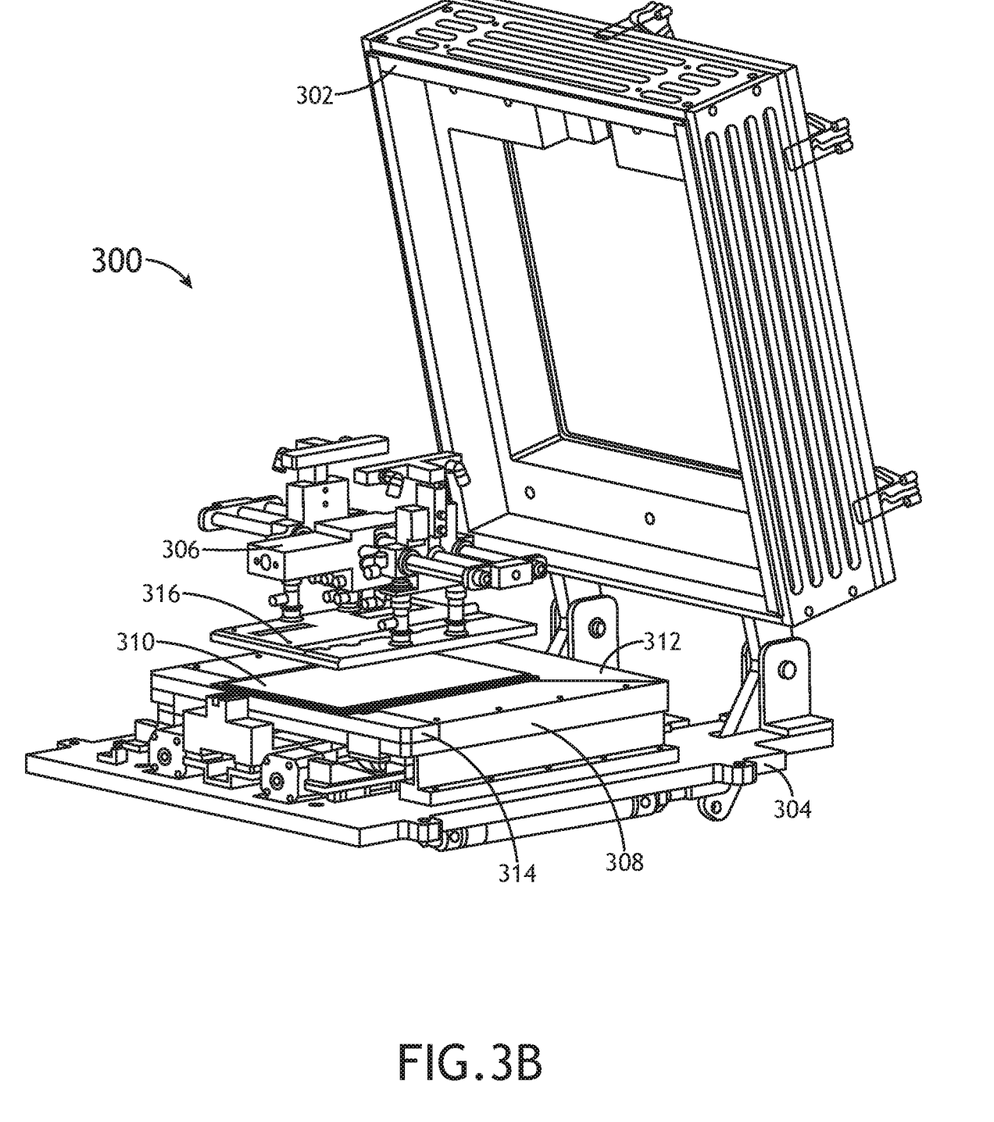
FIG. 3B shows a perspective detail view of a lamination chamber with a handling element according to an exemplary embodiment.

Because of the APS lid opening configuration, the system can easily incorporate a OCR camera to automatically load processing recipes based on the tooling detected in the system Referring to FIGS. 3A-3B, perspective detail views of a lamination chamber 300 according to an exemplary embodiment are shown. The lamination chamber 300 is defined by a lid 302 and base component 304. Within the lamination chamber 300, a positioning element 306 may place lamination components 310, 316 (such as a substrate 310 and laminate 316) on a platen 308. In at least one embodiment, the platen 308 is heated. The isolated heated platen 308 heats the lamination components 310, 316, allowing for rapid system startup, little energy loss, and improved thermal uniformity compared to existing systems. The platen 308 may include one or more work surfaces 312, 314 to receive the lamination components 310, 316 and lower them into position.

The lamination chamber 300 separates the chamber walls from the floor and moves them with the lid 302 so that a camera guidance system can be incorporated for precision placement of an LCD.

In at least one embodiment, the lamination chamber 300 includes a datum-less pinning system to maintain precise work piece registration after the positioning element 306 has released the glass substrate 310.

In at least one embodiment, the positioning element 306 comprises a portion of a robot configured to place the lamination components 310, 316 within the lamination chamber 300.

During a lamination process, the lamination chamber 300 opens automatically and the one or more platen work surfaces 312, 314 rises; the work surfaces 312, 314 may include pinning. A robot operating the positioning element 306 places a glass substrate 310 (or other lower substrate) and vacuum pinning in the work surfaces 312, 314 activates to lock the glass substrate 310 in place. The positioning element 306 releases and moves out of tool. The work surfaces 312, 314 lower such that the glass substrate 310 is completely supported on the platen 308.

The robot then picks and registers a laminate 316 (such as a LCD) in a coordinate system with a camera. Separation pins move into position. The robot places the laminate 316 onto the glass substrate 310 and separation pins. The robot removes the positioning element 306 and the lid 302 closes automatically.

After the direct dry film lamination cycle runs, the lid 302 automatically opens and the robot removes the finished part via the positioning element 306.

Figure 4A:
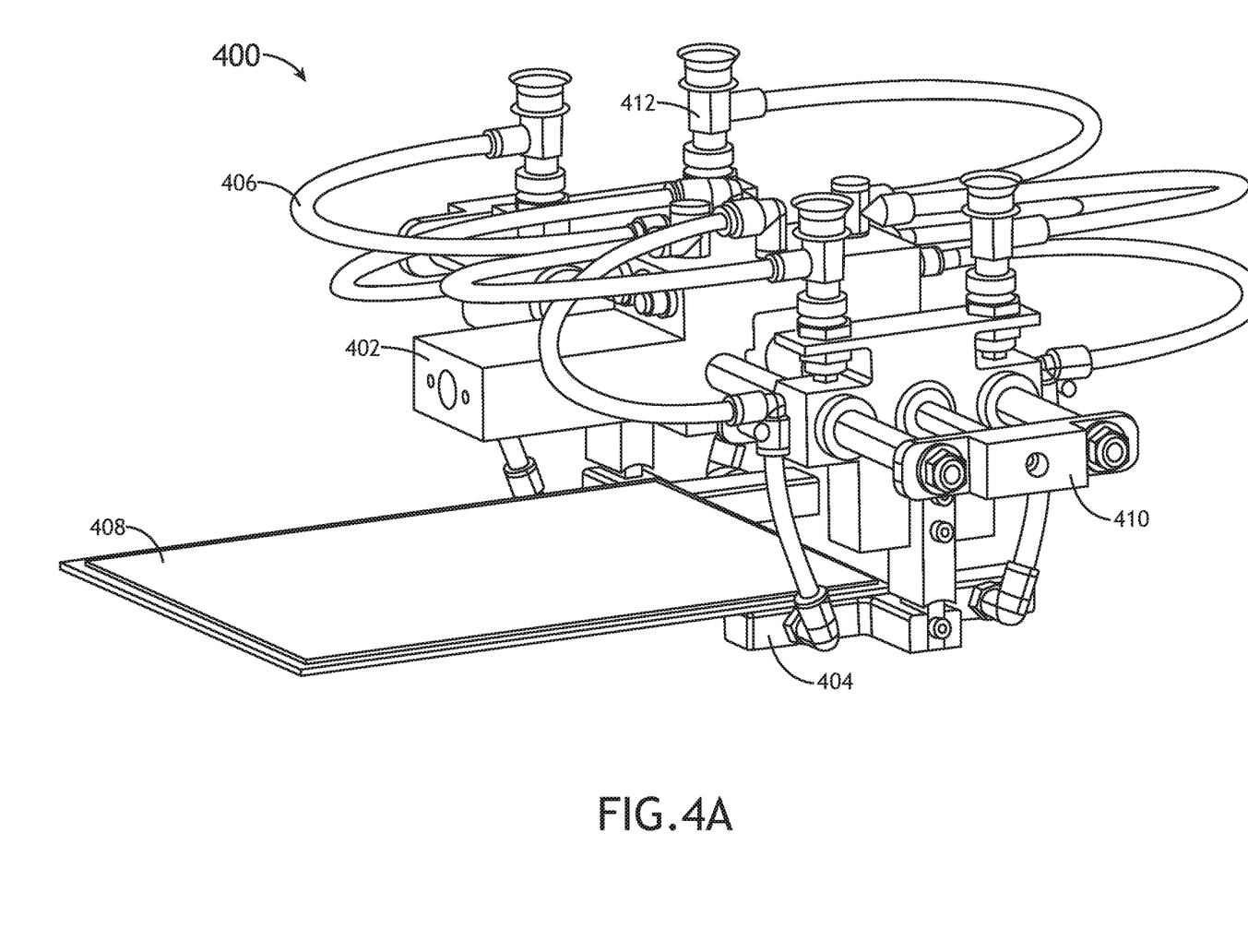
FIG. 4A shows a perspective detail view of a substrate handling element according to an exemplary embodiment.
Figure 4B:
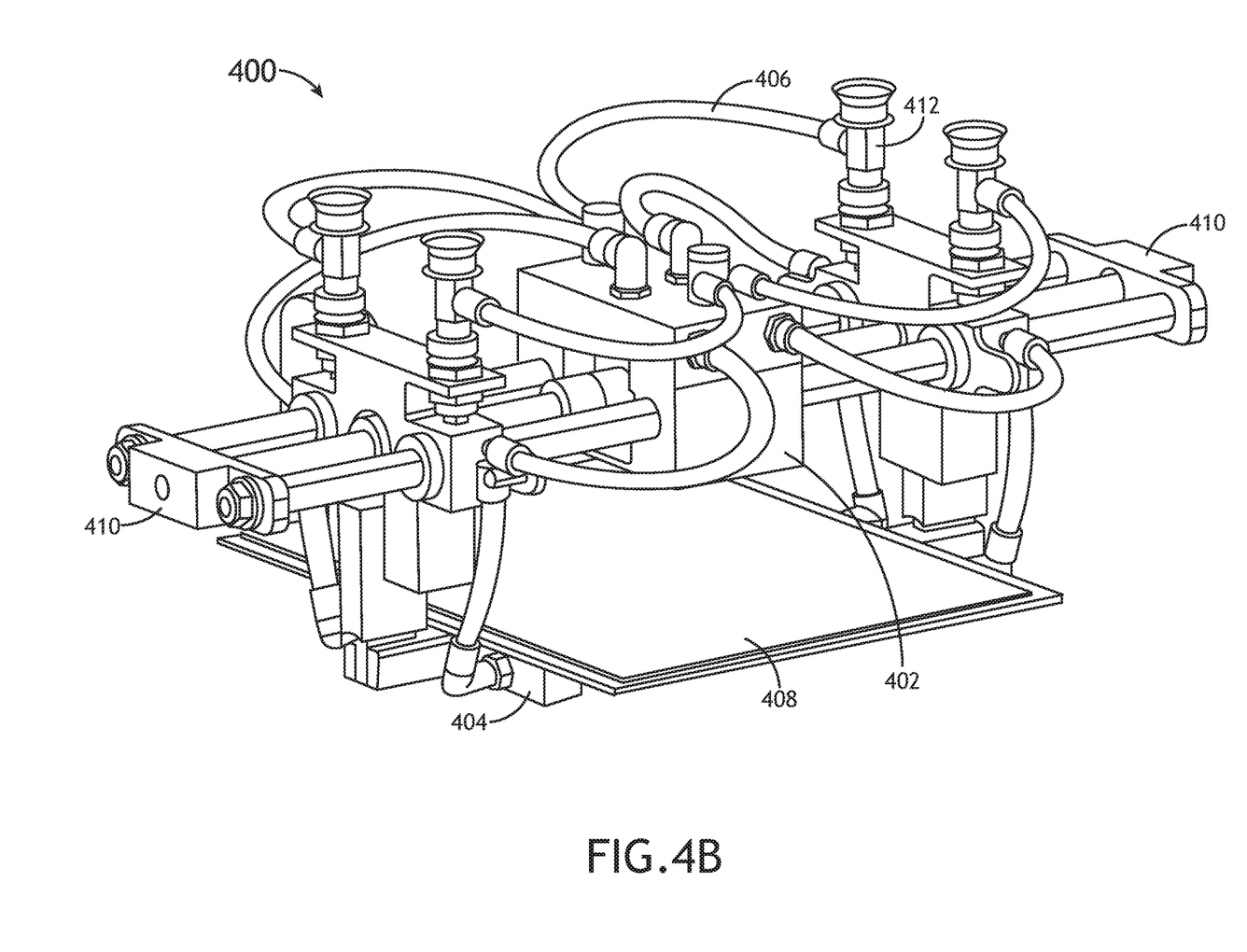
FIG. 4B shows a perspective detail view of a substrate handling element according to an exemplary embodiment.
Figure 4C:
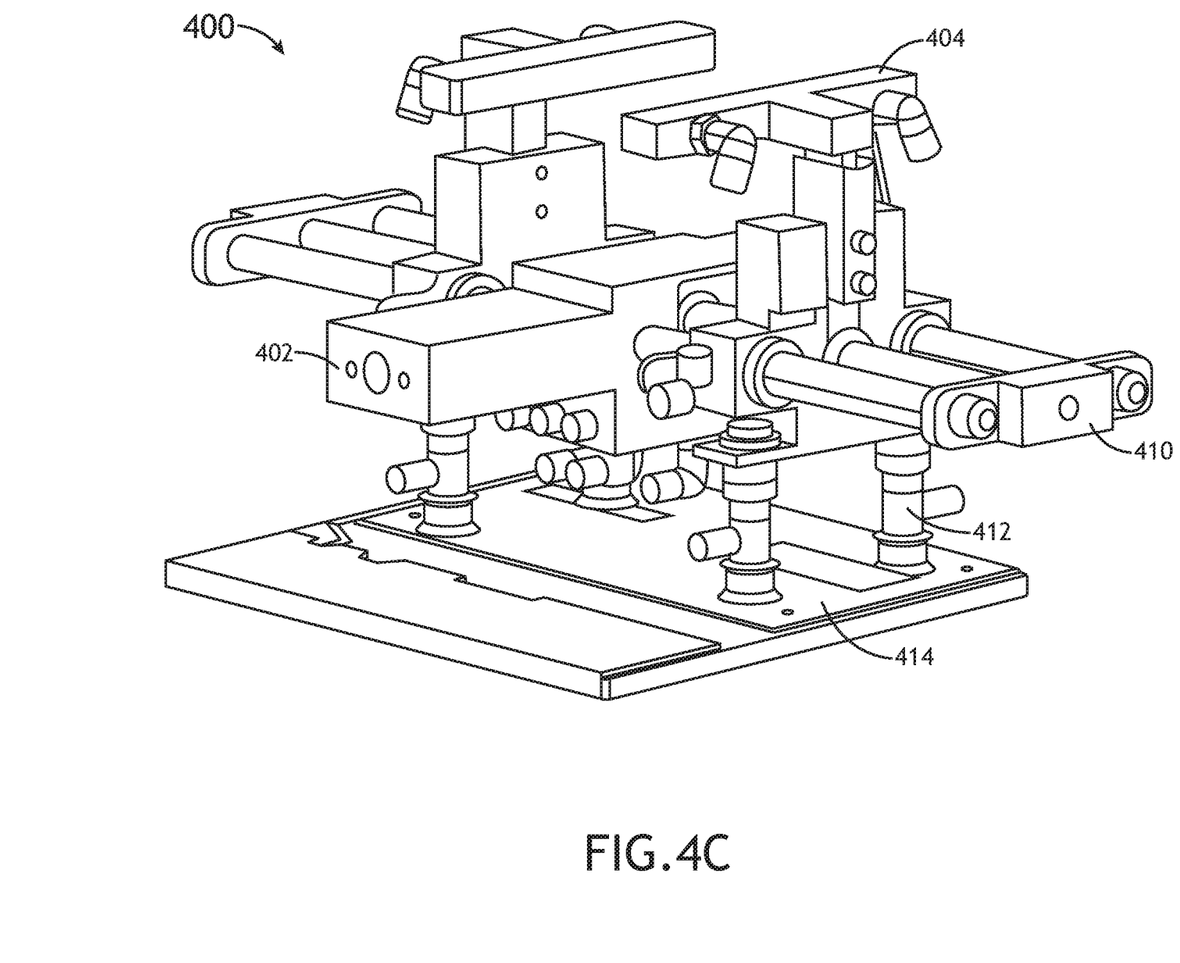
FIG. 4C shows a perspective detail view of a substrate handling element according to an exemplary embodiment.

Referring to FIGS. 4A-4C, perspective detail views of a handling element 400 according to an exemplary embodiment are shown. The handling element 400 comprises a main housing 402 which may serve as an attachment feature for a robot configured to place lamination components in a lamination chamber. One or more glass gripping elements 404 are disposed to be positioned under a glass substrate 408. Each of the one or more gripping elements 404 is connected to a pneumatic element 406. The pneumatic elements 406 may create a vacuum or area of negative pressure at a top surface of the glass gripping elements 404 (a surface proximal to a surface of the glass substrate 408 that will not be laminated). For example, the glass gripping elements 404 may be positioned "under" the glass substrate 408 and a vacuum applied via the pneumatic elements 406 to hold the glass substrate 408 to the hold the glass substrate 408 to the glass gripping elements 404 for transport without touching the surface that will be laminated. While specific embodiments describe pneumatic elements 406, it may be appreciated that hydraulic actuators may be used, or mechanical actuators that provide similar functionality.

Furthermore, the handling element 400 accurately places the glass substrate 408 into the lamination chamber without interfering with the tooling floor.

In at least one embodiment, the glass gripping elements 404 may be disposed on a system of rails 410 or actuators to accommodate glass substrates 408 of different widths.

In at least one embodiment, handling element 400 also includes one or more suction cups 412 for handling a LCD or OLED display 414 to affix to the glass substrate 408. The suction cups 412 may be connected to the pneumatic elements 406 and thereby to a controller.

In at least one embodiment, the handling element 400 is reversible with the glass gripping elements extending from the main housing 402 in one direction and the suction cups 412 extend from the main housing in an opposite direction. A robot including the handling element 400 may rotate the handling element 400 via a motor connected to the main housing 402.

The handling element 400 may pick up and handle thin glass due to the ability to reach around to the bottom side (below-board) and vacuum pin the glass to the bottom and apply slight tension to the glass while in motion to prevent excess bowing. The handling element 400 is also able to use below-board vacuum pinning to grip any glass that has PSA applied right to the outer edges so that there is no risk of the PSA sticking to the handling element 400 which may cause a movement while the handling element 400 releases the glass. Such movement would cause a loss of proper registration and the alignment would move out of tolerance.

In at least one embodiment, the handling element 400 also has split chambers for below-board vacuum pinning so that it is able to handle very small, cell phone sized parts, and will still be able to locate the glass at the leading edge of the amination chamber.

In at least one embodiment, the handling element 400 is stepper motor driven so that the suction cups 412 can be rapidly positioned to account for different LCD or OLED sizes.

Figure 5:
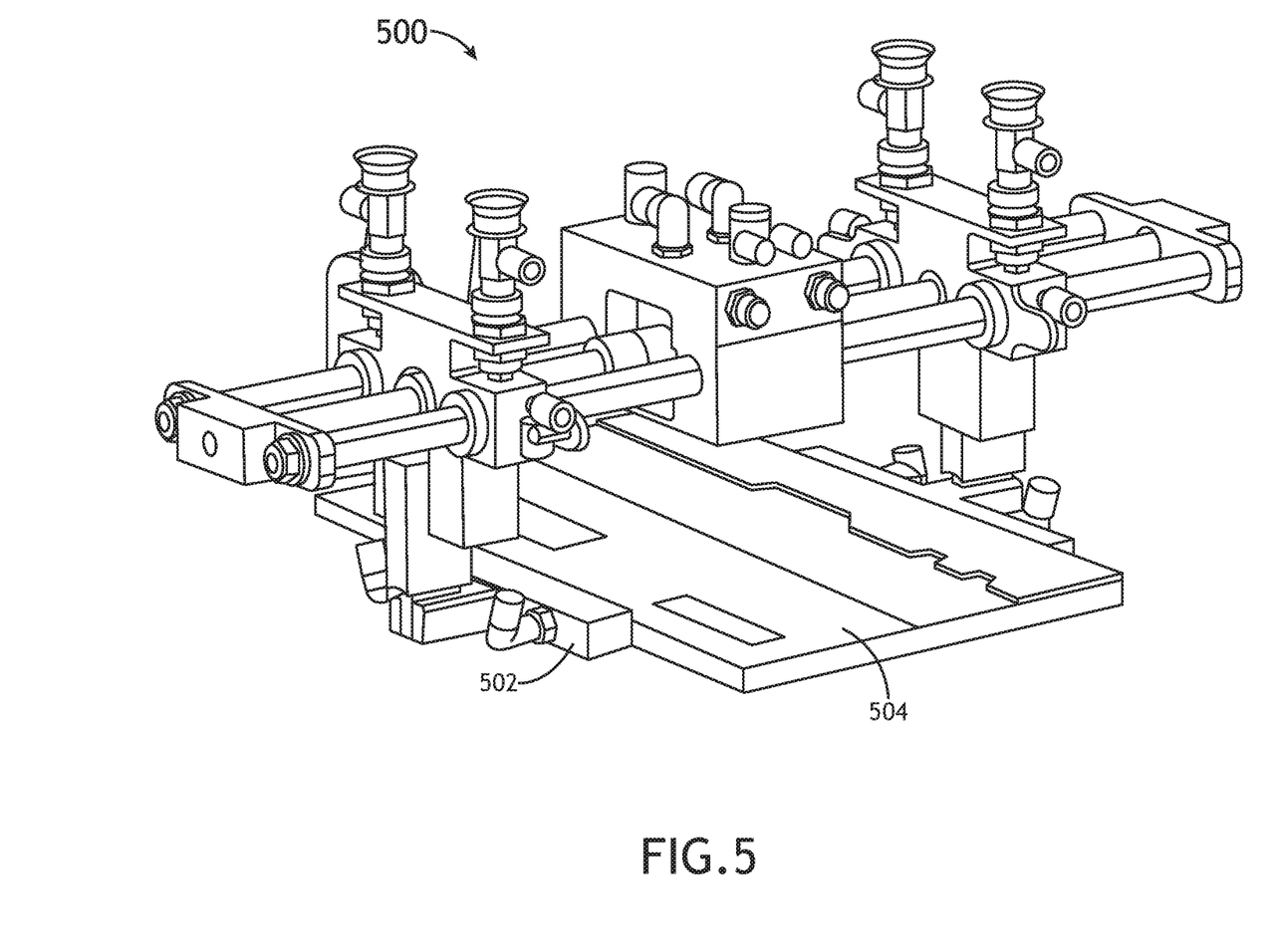
FIG. 5 shows a perspective detail view of a substrate handling element according to an exemplary embodiment.

Referring to FIG. 5, a perspective detail view of a substrate handling element 500 according to an exemplary embodiment is shown. The handling element 500 may include gripping elements 502 adapted to also grip a lamination element 504 by the edges. The handling element 500 may be positionable with stepper motors, but also has dual load cells to give controller feedback such that it can be driven to grip more or less based on the mass of the item being moved.

Lamination systems according to embodiments of the present disclosure may be clustered together to utilize a robot to its full capacity for loading and unloading components. Such systems would be adaptable to a variety of automation configurations including customer supplied robotics. Some embodiments allow for flexible membrane installation, control, and pressure uniformity.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A laminating apparatus comprising:
    a base component;
    a lid connected to the base component via at least one hinge;
    at least two clamping mechanisms disposed on the lid, each comprising:
        at least base component engaging element, each configured to releasably engage a corresponding clamping recess defined by the base component; and
        at least one track defined by each clamping mechanism, each of the at least one track defined on at least one edge by sloped portion; and
    at least one roller configured to translate within the tracks defined by the clamping elements, and thereby a force between the base component and the lid.

2. The laminating apparatus of claim 1, further comprising a heated platen within a lamination chamber defined by the base component and the lid.

3. The laminating apparatus of claim 2, wherein the heated platen comprises one or more positioning elements and at least one motor configured to raise and lower the positing elements with respect to the heated platen.

4. The laminating apparatus of claim 3, wherein the positioning elements comprise vacuum pinning elements.

5. The laminating apparatus of claim 2, wherein the heated platen further comprises a plurality of separation pins.

6. The laminating apparatus of claim 5, further comprising one or more stepper motors configured to actuate the plurality of separation pins.

7. A high-speed lamination system comprising:
a base component;
a lid connected to the base component via at least one hinge;
a robot having a positioning element comprising two or more below-board gripping elements configured to engage an under surface of a glass substrate;
at least two clamping mechanisms disposed on the lid, each comprising:
   at least base component engaging element, each configured to releasably engage a corresponding clamping recess defined by the base component; and
   at least one track defined by each clamping mechanism, each of the at least one track defined on at least one edge by sloped portion; and
at least one roller configured to translate within the tracks defined by the clamping elements, and thereby a force between the base component and the lid.

8. The laminating system of claim 7, further comprising a heated platen within a lamination chamber defined by the base component and the lid.

9. The laminating system of claim 8, wherein the heated platen comprises one or more positioning elements and at least one motor configured to raise and lower the positing elements with respect to the heated platen.

10. The laminating system of claim 9, wherein the positioning elements comprise vacuum pinning elements.

11. The laminating system of claim 9, further comprising one or more stepper motors configured to actuate a plurality of separation pins defined by the heated platen.

12. The laminating system of claim 7, wherein:
the positioning element further comprises a plurality of suction cup elements configured to engage a laminating component;
the suction cup elements are disposed on a side of the positioning element opposite the below-board gripping elements; and
the positioning element is rotatable.

13. The laminating system of claim 7, wherein the two or more below-board gripping elements are further configured to engage opposing edges of a glass substrate.

14. The lamination system of claim 7, wherein the at least two clamping mechanisms are configured for flexible membrane installation and pressure uniformity.

* * * * *